United States Patent [19]

Coen et al.

[11] Patent Number: 5,194,746
[45] Date of Patent: Mar. 16, 1993

[54] METHOD AND DEVICE FOR EXAMINING COMPONENTS WITH DATA DIGITIZED INTO A LARGE NUMBER OF GRAY LEVELS

[76] Inventors: Günther Coen, Gerresheimer Landstr. 167, 4000 Düsseldorf; Rudolf Kretschmer, Bebelstr. 33, 4200 Oberhausen; Friedhelm Niehues, Walder Str. 17, 4010 Hilden; Roland Keck, Brend'amourstr. 78, 4000 Düsseldorf, all of Fed. Rep. of Germany

[21] Appl. No.: 767,561

[22] Filed: Sep. 30, 1991

Related U.S. Application Data

[63] Continuation of Ser. No. 540,226, Jun. 19, 1990, abandoned.

[51] Int. Cl.$^5$ .................................................. G01N 21/88
[52] U.S. Cl. .................................... 250/563; 358/106; 356/431
[58] Field of Search ................ 250/562, 563; 358/106, 358/107, 101; 382/8, 41; 356/430, 431, 237

[56] References Cited

U.S. PATENT DOCUMENTS

| | | | |
|---|---|---|---|
| 4,395,699 | 7/1983 | Sternberg | 382/41 |
| 4,707,734 | 11/1987 | Labinger et al. | 382/8 |
| 4,799,175 | 1/1989 | Sano et al. | 382/8 |
| 4,920,572 | 4/1990 | Sugita et al. | 382/8 |
| 4,989,082 | 1/1991 | Hopkins | 382/8 |

OTHER PUBLICATIONS

Qualitat und Zuverlassigkeit, "Automatic Evaluation of X-ray pictures of the REBUS System", No. 1, pp. 33-36, 1987.
Metallurgical Plant and Technology, "Automatic analysis of defect images in radiographic inspection", pp. 66 and 67, 1988.

*Primary Examiner*—David C. Nelms
*Assistant Examiner*—Que T. Le
*Attorney, Agent, or Firm*—Jacobson, Price, Holman & Stern

[57] ABSTRACT

A method and device for processing and representing data corresponding to defects in a part, wherein an initial image is discretized into a plurality of image points and the intensity at each point is digitized by gray level, for display on a monitor. For a monochrome monitor, for which the number of distinguishable gray levels generally corresponds to 8-bits, the number of gray levels in the above digitization is greater, for instance 12 or 16 bits, and the entire image is not displayed simultaneously but rather over a display cycle. At any one instant in the cycle, one or more parts of the image is displayed, the full range of gray scales of the monochrome monitor mapping at that time to a sub-range of the levels of gray of the digitization process. Thus the operator can perceive a large number of gray levels. For a color monitor, digitized data of all the gray scales can be represented by assigning each gray level to a corresponding color. Since there are generally more colors available than the number of gray levels, criteria can be used to eliminate candidate colors. The assignment of colors to gray levels is performed in a manner to allow an observer to perceive the succession of light to dark in the gray scales, namely by an appropriate corresponding succession between distinguishable colors.

19 Claims, 3 Drawing Sheets

METHOD AND DEVICE FOR EXAMINING COMPONENTS WITH DATA DIGITIZED INTO A LARGE NUMBER OF GRAY LEVELS

This is a continuation of application Ser. No. 07/540,226, filed Jun. 19, 1990 which was abandoned upon the filing hereof.

BACKGROUND OF THE INVENTION

1. Field of the Invention

The present invention relates generally to a device and method for visually representing image data on a display monitor, particularly data digitized into a large number of gray levels, generally much larger that $2^8$ levels. The invention more specifically concerns representing data as a part of a computer processing analysis, such as for testing structural parts for defects.

2. Description of the Prior Art

Processes for testing strucural parts are known in the art. One is reported in the publication by R. Keck and G. Coen, "Automatic Evaluation of X-ray Pictures with the REBUS System", in QZ (Qualität und Zuverlässigkeit) 32, 1987, No. 1, pp. 33-36, for determining defects in weld seams in structural parts.

SUMMARY OF THE INVENTION

An object of the invention is to represent image data in a display, wherein the data represents a signal that is digitized into a very large number of discrete steps, such that the differences between the values of the digitized signal as represented by the intensity or color of the pixels of the display can be discerned by an observer watching the display.

Yet another object of the invention is to display the image data on a monochrome monitor with gray levels corresponding to the discrete steps in signal value, wherein the number of steps of the digitization exceeds the number of gray levels of the display.

A further object of the present invention is to employ a monochrome display as above so that the available range of gray levels represents at different sub-ranges of the gray levels within the full range of gray levels of the digitization, the display of all the various values of the digitized signal levels over the entire display being completed over a period of time.

With regard to such use of monochrome monitors, the invention is further directed to the method of what is termed the equidensity representation, wherein the steps of the digitization are adjusted to cause each gray level to occur in the image approximately the same number of times.

Another object of the invention is to employ a color monitor which is capable of displaying a large number of colors and to assign a particular distinguishable color to each discrete level of the digitization, to provide a simultaneous display of all the digitized signal levels over the entire display, in a manner which allows the operator to perceive the succession along the gray scales.

The invention further relates to such simultaneous displaying of an image of highly digitized data on the color monitor according to a method of display referred to as the pseudo color representation, wherein the succession of gray levels of the digitization corresponds to a predetermined path along selected points in color space.

DESCRIPTION OF THE PREFERRED EMBODIMENTS

Figure 1:
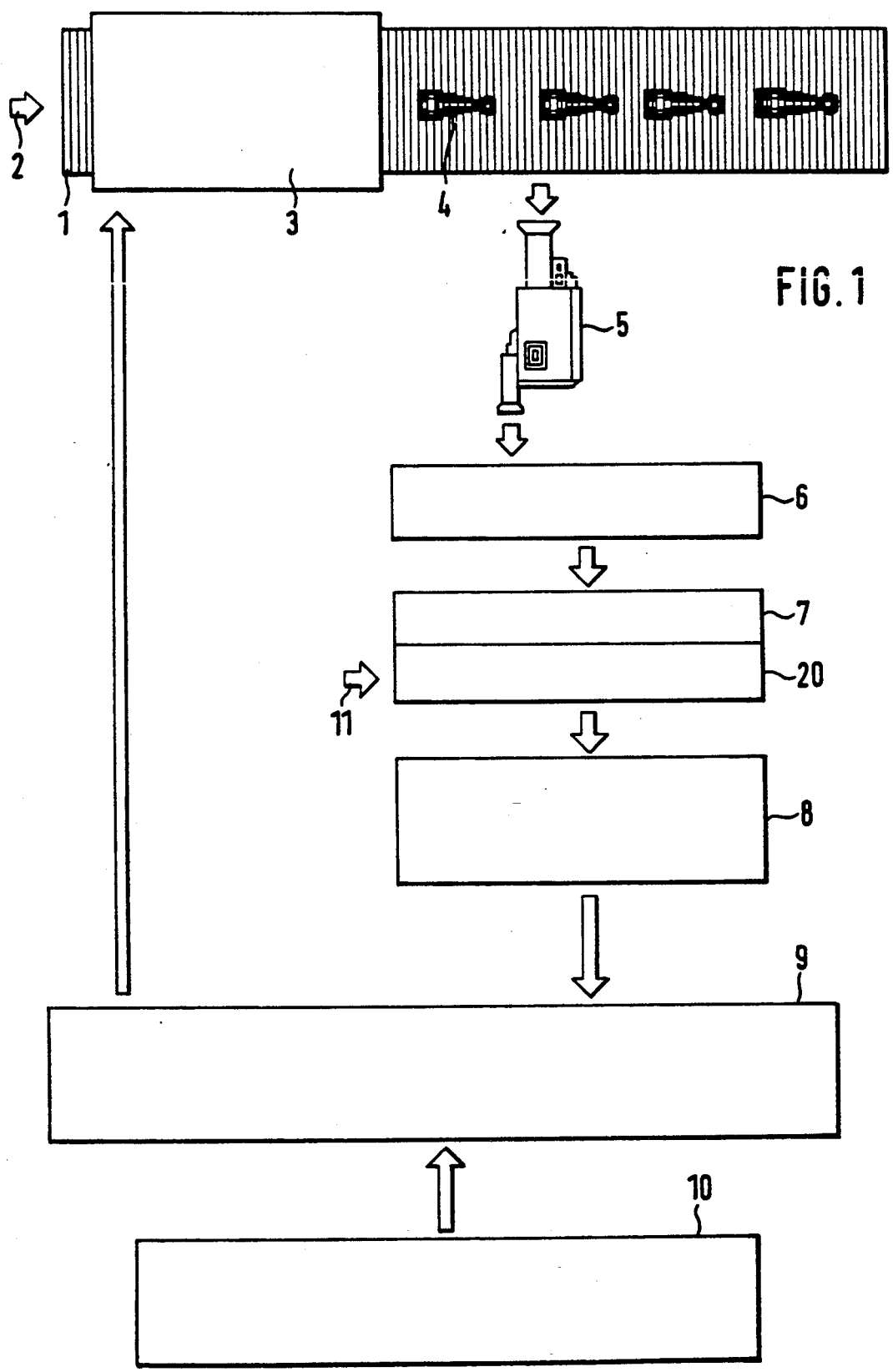
FIG. 1 is an overall representation of the process according to the invention.

The present invention will be understood from the detailed description of the specific embodiments hereinbelow and from the respective drawings. The description and drawings of the embodiments are for explanation only, and are not intended in any way to limit the invention.

An x-ray picture can serve as an original image of a structural item or component which is to be analyzed for defects on the basis of the levels of brightness of the x-ray picture in the region of interest, in this case the intensity at each image point being in the nature of an analog quantity. The x-ray picture is first discretized into image points spanning the x-ray image of the item to be analyzed for defects, and then subjected to digitization by analog-to-digital (A/D) conversion and to further processing, such as segmentation, noise suppression, defect edge recognition, possible defect isolation, defect feature extraction, pseudodefect exclusion, defect classification and evaluation. At each step the resulting processed image may be represented in a display system.

As is known, the original x-ray is first broken up into a grid of, for example, 512×512 image points. The analog image intensities in the areas corresponding to those points are then digitized into 256 discrete intensity values, that is, into shades of gray conforming to the reproduction capability of the display system. Any information loss caused by this discretization and digitization, each of which transformations can introduce an effective respective noise into the processed image, can be reduced by discretizing and digitizing a plurality of the original X-ray images, and by summing up the digitized intensity values for the same discretized point of each x-ray, with subsequent division of the sum by the number of images. The optimal number of original x-ray images can be computed by means of a program.

From this discretization of pixels and digitization of the gray levels, a gray-value-coded view of, for instance, a wall area of the part being inspected which contains a weld seam, is produced. From this the above-mentioned segmentation step proceeds by generating a synthetic background image which overlooks (in the sense of smearing over, or causing to effectively disappear) any defects in the weld seam. A difference image or picture is then generated from the difference between the value of the gray levels of that gray-level-coded view and of that synthetic background image, which provides an image representation which serves as the basis for further processing.

This process can be applied to any original image which serves for quality assurance of structural parts, wherein the original image may be obtained by nondestructive testing or even by destructive testing. Besides x-ray pictures, ultrasonic pictures, one can employ magnetic stray flux images, color penetration images and macroscopic and microscopic images of the ultrastructure and surface of the structural parts.

For the defect representation on a monochrome monitor, the data imaging can be substantially improved by a dividing a large dynamic range of gray levels into a plural smaller sub-ranges, wherein the number of gray levels of each sub-range is equal to the number of gray levels that the monochrome display can distinguishably represent at one time. This is similar to the gray scale accomodation capability of the human eye. The result obtained can be used in the appropriate manner for assuring the quality of the corresponding structural part so that damage to an installation in which the structural part is in use or is to be used can be avoided or reduced.

The invention allows the distinguishable displaying of an image signal with a large number of digitization levels.

For the case of a gray level display with a data representation system employing a monochrome monitor, the digitization of the analog intensity value of the original image is performed to an extent, which, as opposed to the previously known method, is considerably beyond the number of gray levels which the monochrome monitor can display. As a result, the precondition (that is, providing an image with a large number of gray levels) for a generalized segmentation is created in order to perform the reduction to a sufficient number of gray shades remaining in the above-mentioned difference image.

For the problems to be solved, parameters are contained in the program for performing the segmentation. The values of the parameters in each case can be precisely varied in order thus to make a problem-oriented optimal choice possible, so that the large number of image information items, that is, potential defects, to be evaluated can be taken into account.

The envisioned segmentation, to choose a straightforward illustrative example, is primarily a filtration in which the segmentation represents the filter per se and in which a parameter, e.g. the diameter of the filter opening, is variable by assigning a corresponding value to it. These variable parameters are problem-oriented per se, that is, various ones represent different size and shape characteristics of the filters to be applied depending on the type of defect in issue.

The values of the original analog image as discretized and digitized according to the invention also contain noise, e.g. the noise stemming from the shape of the part or article being examined for which a filtration is performed. As a result, this leads to the fact that the discretized and digitized values are filtered before the image processing by the segmentation and the sensitization of the latter by parametrization. The segmentation involves a variably configurable assignment of the features of the potential defects in the image to the parameters of the segmentation process. Since the parametrization is problem oriented, the decisive data for the decision of whether the defect in question exits can be made by the corresponding parameter, that is, with respect to type, size, and alignment of the defect in question.

Because of the above-mentioned variable assignment of the features of the image to the corresponding parameter values for the segmentation, only the data for defects larger than the respective tolerable defects are preserved for further processing for defect measurement for final decision, that is, whether to rework or remove the article, while the data for smaller defects can be discarded.

The above comparison with the tolerable defect dimensions generally is based on data on defects that were discovered empirically that is, on other examples of the same part having known defects. Thus if one finds that a defect in a structural part exceeds the tolerable dimension, measures are taken for quality assurance either by intervening in the production process with the objective of reducing the dimension of the defect below the tolerance limit (quasi on-line), or by removing or replacing the part if it is already in use in an installation.

Ordinarily for digitization for a monochrome display system, in correspondence with the capability of such a data representation system, 8 bits of gray shades are resolved. However, according to the present invention, the scope of resolution for the digitization of the gray levels of the original image is selected at 12 or even 16 bits, even while the data representation system remains limited at 8 bits corresponding to 256 gray shades.

The large number of digitized gray levels from the analog image can be divided into groups, each with only 256 gray levels, with each group being shown consecutively on the monochrome display. The pixels having gray levels within one of the groups are simultaneously displayed, followed by the pixels having gray levels in the next group.

In the case of such dividing into groups according to what is referred to here as the equidensity representation, an optimized gray shade fitting occurs in the two-dimensional image so that every 8-bit gray shade is represented at almost the same frequency after the transformation. In other words, the height of each step in the succession of gray levels for the image to be displayed is adjusted so that every one of the gray shade levels resulting from the digitization occurs at the same number of pixels of the total image.

Initially, for example, $1024 \times 1024$ image points may be used to determine the frequency distribution with respect to the gray shades present. In the case of 12 bits, $4096 = 2^{12}$ gray shades or levels are possible. However, only $256 = 2^8$ gray shades can be represented on the monochrome display. The gray shades of the original image are therefore initially divided into groups, in this case $2^{12-8} = 2^4 = 16$ groups, which, in turn, are divided into 256 classes with the qualification that each of these 256 classes of each group represents an equal number of the gray shades of the original image. Of the, for instance, $2^{20}$ image points of the original image, each can assume only one of the 4096 different gray shades. Thus, each of these individual gray shades has a different frequency, because any one gray shade typically occurs at several different points of the original image.

For the above embodiment of the invention employing a monochrome monitor, the data representation system displays one of the above 16 groups of gray scales after the other, consecutively. While each group is displayed, the eye distinguishes the 256 shades of gray within that group. Therefore the entire image is displayed over one image cycle. This leads to a considerably increased resolution of the scope of the gray shades and thus of contrast recognizability.

The defect testing in the case when the equidensity method therefore involves a consecutive representation of different part of the image for the parameter value determinations.

According to another aspect of the invention, in this case for use of a color display in the data representation system, the pseudo color method can be used for displaying the processed data in the testing for defects. This method is based on the well known color cube, in which the space diagonal starting at the origin of the coordinates has $2^{12}=4096$ shades of gray. If one uses the proportion of four bits from the number of gray shades as a basis for each of the individual primary colors red, green, and blue (RGB), then this would lead to an unequivocal assignment, but the error evaluation would lose its purpose, because the coordination between the succession of the gray shades from the corresponding colors, the number of which is limited by the number of bits, could no longer be performed by the human eye.

To reduce or avoid this difficulty, according to this embodiment of the invention, 8 bits can instead be used for each of the primary colors RGB. To limit the total number of gray levels to less than $(2^8)^3=2^{24}$, for example to only $2^{12}$ gray shades, the total number of corresponding colors (mixtures of the primary colors in the RGB coordinate color representation system) in the display can be limited by any appropriate selection criterion. For instance, the colors to be displayed can be selected in any desired manner from a subset defined as just the equiluminant shades of all the individual colors, so that only $2^{12}$ colors remain out of the initial $2^{24}$ colors.

Each such color has the same light density (luminance). This reduction in the number of candidate colors for representing the 4096 gray levels is necessary, but it is still not sufficient since there may be still more colors than gray levels, and further because the sequence of colors, corresponding to the sequence of gray levels, remains to be specified. Reducing the number of candidate colors to those which are especially easily distinguishable from one another, is one method by which a sufficient condition for assigning gray scales to colors can also be fulfilled.

Another example of reducing the number of candidate colors, one can confine oneself to the red-green coordinate system and introduce the mixed color yellow so that the primary color blue is totally eliminated from the evaluation, resulting in a reduction from $2^{24}$ to $2^{16}$ colors. Other suitable criteria from the standpoint of optimal recognizability can be introduced in each specific case, in order to arrive at the necessary one-to-one transformation between gray shades and equiluminant color mixed values.

The pseudo color embodiment of the invention as represented above does not involve merely a transformation from gray shades to pseudo colors. Assignment of pseudo colors to gray shades is known, for example, as in the publication "Fundamentals of Interactive Computer Graphics", p. 132-134, 489-491, by J. D. Foley, and A. van Dam's "The Systems Programming Series" of Addison-Wesley Publishing Co., London, Amsterdam, Sydney. The present invention involves assigning colors to a large number of gray scales, and doing so in a manner that allows the transition along the gray scales in the original image to be readily perceived by an observer of the processed image on the display of the processing system.

According to this pseudo color embodiment of the invention, simultaneous representation of an image occurs for the determinations of the parameters characterizing defects.

Both in the case of successive and also simultaneous representation of defects, the invention deviates from known techniques in prior art segmentation (characterized by parameter-free discrimination of image foreground and image background). The present invention takes advantage of the fact that parameter values are variably adjusted depending on the defect type and size. In the case of simultaneous representation, two parameters are used in particular which permit, for example, a type-specific and a size-specific separation of the individual defects in that the first parameter preferentially responds to type-specific features and the second parameter preferentially to size-specific features.

The segmentation with the above-mentioned parameters is a precondition for the application of a first expert system which allows one to subject any images permitting a qualitative pronouncement (that is, determining whether a flaw exists or not) to an evaluation (that is, further determining of quantitative information on the defect). In such an evaluation within the context of the segmentation, the number of parameters and the type of the algorithms is not changed. Although numerical values that can be given to the parameters undergoing a change in order to perform problem orientation in this way, the expert systems as such are not changed. In such a type of an expert system only the knowledge base is modified depending on the problem posed, while the greater part of the contents of the expert system (which part is generally referred to as the shell of the expert system) is preserved.

In both cases, therefore, i.e., both for the parameters and also in the case of the expert system, there is only an exchange of numbers which are of smaller number in the case of the parameters, while they may amount to a few thousand in the case of the expert system. It is decisive for this that every type of image corresponds to a different knowledge base and a different system of its selection criteria. Thus the first expert system (within the segmentation step 20 in FIG. 1) in connection with the invention has a significantly larger scope than previously employed in the art, because different available knowledge bases underlie it.

The second expert system (within the supplier 10 of the tolerable defect value in FIG. 1) is required for the purpose of prestoring a tolerable defect dimension for classification by type, position, size and orientation and presumes an also enlarged scope since it also requires several knowledge bases.

It is fully within the scope of the invention to further expand the dynamic range of the digitization, that is, of the number of gray levels to which the original image data is digitized, by, for example, expanding the 12-bit gray shades to 16-bit gray shades. Such an expansion of the number of the gray shades, however, does not lead to an increase in the resolution of gray shades in the original image. Such an expansion, however, has the advantage that a deterioration of the signal dynamic upon passing through several processing steps is less pronounced. The information loss can be strongly reduced in this way if not entirely excluded.

Also the local discretization can be expanded by generating, for example, subimage points up to a limit of $64 \times 64$ new image points per original image point.

The process according to the invention can be realized on processors of the series 68OXX (MC 68000, 68010, 68020), as well as on other coprocessors such as the MC 68881. In addition a graphics card and an image inputting system, e.g. a laser scanner with at least 12 bits of dynamic range, may be used. The data representation system is connected to a comparator in order to compare with the prestored values to determine whether the size of the defect is tolerable. A signal can be arranged to be output as a result of this comparison, which then can be used to intervene when the tolerable defect dimension is exceeded, either in a controlling manner in the production process, or to cause the structural part to be removed from its operating position and replaced.

According to FIG. 1, an initial product is loaded in the direction of arrow 2 on a path 1 in order to be fabricated into structural parts 4 in manufacturing process 3. The manufacturing process 3 involves a controllable machine which can be adjusted for the defect-free production of structural parts. Regarding structural parts 4, it is presumed that their production may also involve externally perceptible defects. In a simple case wherein the defect can be directly visually observed, the overall picture of a structural part 4 is registered by the video camera 5 which generates the original image for further processing. Generally, the video camera can be replaced by any imaging system which can provide some geometrical record of the defects of interest. The original is processed in the step of the discretizing system 6 into image points which are further processed by the step of the digitization unit 7, according to the methods of the invention as described above.

At least for the case of monochrome display, the digitization goes at least one bit beyond the display capability of the data representation system 8. Coupled with the digitization unit 7 is the segmentation unit 20 into which, according to the invention, the possibility of outside intervention 11 exists in order to be able to exclude unimportant image regions. The parameters for representing any specific defect feature are assigned in a problem-oriented manner. At this time, the number of gray shades is reduced (by the forming of the difference image as described above) to the extent that it can be further processed in the subsequent representation step 8. Decisive for this reduction is either the equidensity representation or the pseudo color representation as described above as well as the result of the image evaluation after the use of the above-mentioned first expert system.

The output of the data representation system 8 makes the nominal (that is, the quantitative) value of the defect available for the operation of the control circuit 9 reproduced in FIG. 1, that is, to provide the necessary feedback to further work the part to reduce or remove the defect. The desired minimally acceptable value is prepared on the basis of the second expert system in the desired-value giver 10. The desired values establish the tolerable defect dimension with regard to type, size, orientation and position of the defects. These prestored desired values are compared with the nominal values in the regulator 9 and lead to intervention in the production process 3 if the defect tolerances are exceeded. The intervention takes place via an adjusting member in such a way that the production conditions are changed in such a way that the detected defects are excluded or at least are reduced in scope below the tolerable dimension.

Figure 2:
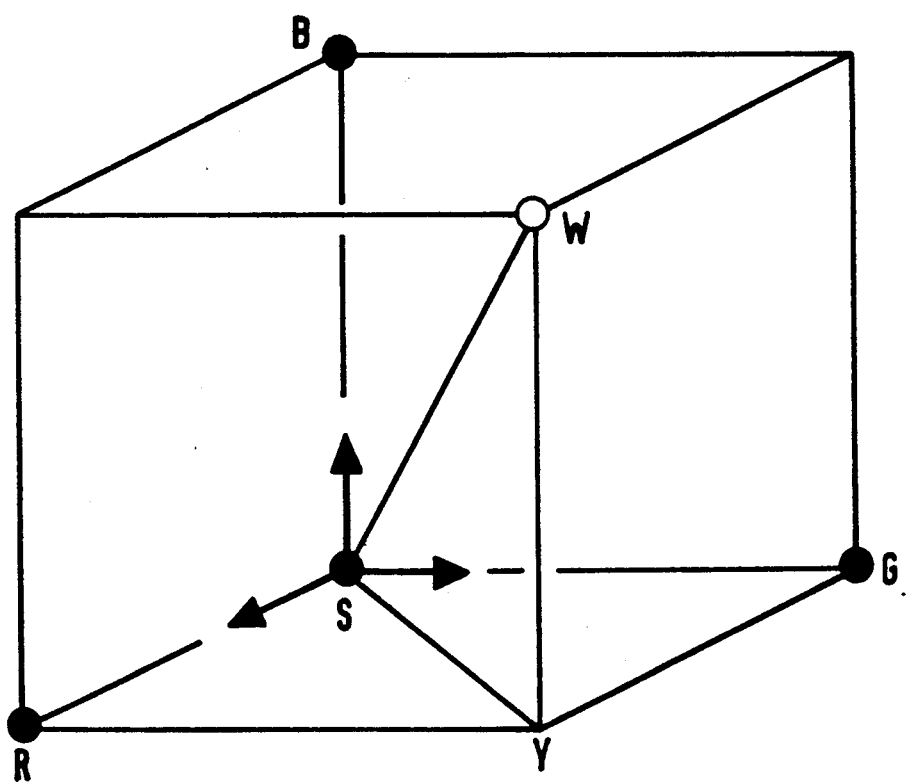
FIG. 2 is a color cube to illustrate the defect recognition by means of the pseudo color representation.

The color cube shown in FIG. 2 starts from the coordinate origin S which is assigned the base color black. The three space coordinates R=red, G=green, and B=blue, in each case starting with black, lead to a 100% color saturation. They characterize a point in space W=white which is connected to S by the space diagonal of the gray shades. If a resolution of 8 bits is used as the basis per color channel R, G or B, this leads to $2^{24}$ color values. The space diagonal S/W, however, permits only the reproduction of 8 bits corresponding to 256 gray shades.

If $2^{12}$ gray levels are desired, therefore $2^{12}$ colors must be selected for the pseudo color representation. The system provided for visual defect recognition by the color assignment must necessarily take into account and be based on the sensitivity of the human eye.

In connection with the pseudo color embodiment of the invention described above, the luminance given by:

$$L=0.30\times R+0.59\times G+0.11\times B,$$

where the letters R, G and B represent the colors red, green and blue. Accordingly, a very high sensitivity exists for the color green. A very high color sensitivity also exists in the RG plane. The color yellow is presented in the color cube of FIG. 2 by the point Y, and is attained by a mixture of R and G. Progressing along the diagonal SY in the RG plane from black at the origin, the saturation increases up to the fully-saturated yellow color. Thus if one blocks out the visually unfavorable color blue and uses only the colors red and green, one can also represent the color yellow so that one already achieves a reduction by 8 bits by introducing the above-mentioned color yellow.

As described above, other suitable criteria can also be introduced depending on optimal recognizability in order to produce the transformation between the gray shades and the equiluminant mixed color values. As a result this leads to the reduction in the number of gray levels when the difference image is formed while keeping a sufficient number of gray levels, to the extent that the data representation system permits realistic and meaningful processing.

Figure 3:
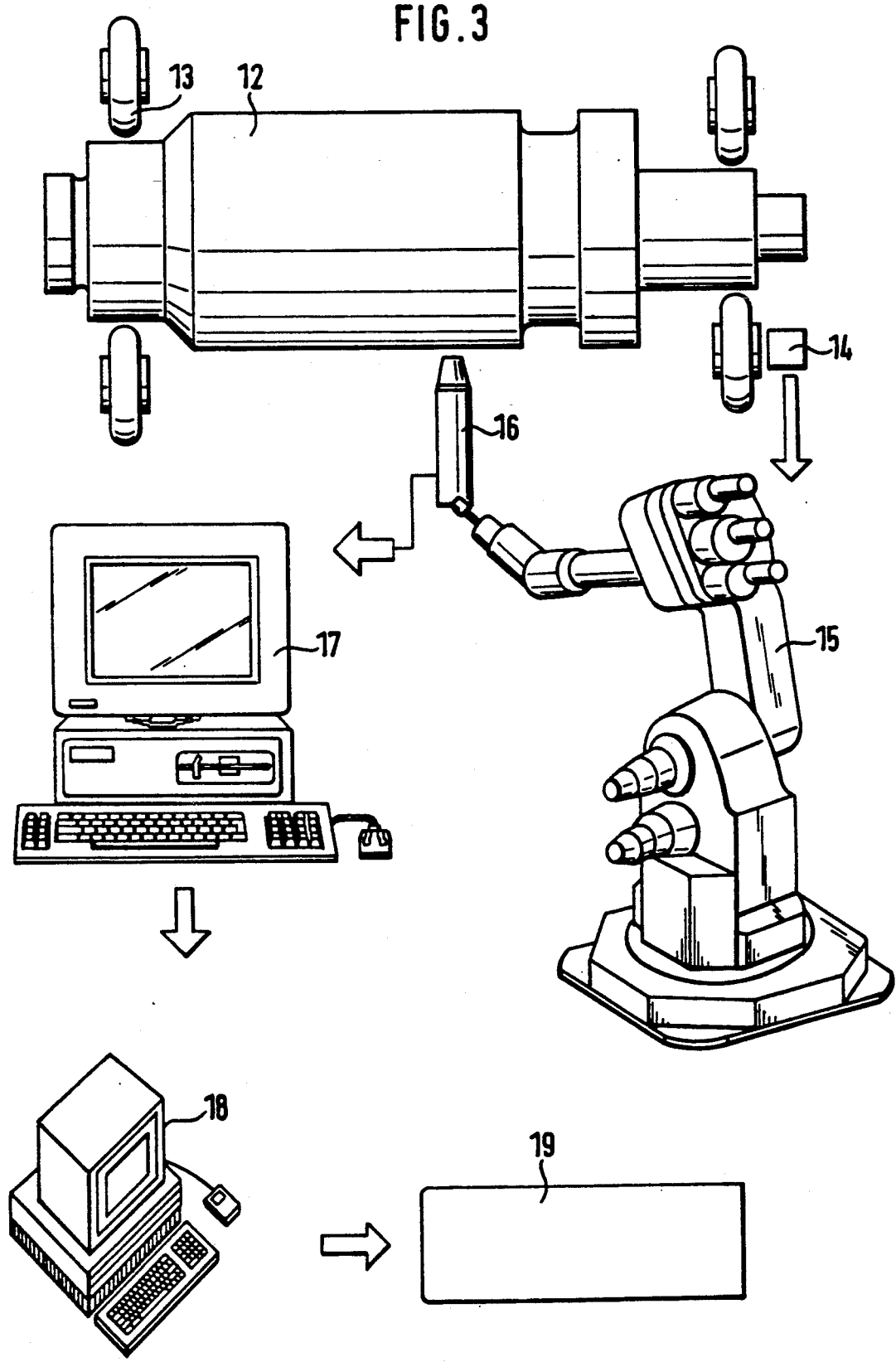
FIG. 3 shows the use of the invention in testing a forged shaft.

The testing of a forged shaft according to the invention is shown in FIG. 3. The forged shaft 12 is driven in rotation by the friction wheels 13, a rotation counter 14 being connected with one of the friction wheels 13 of a roller block which transfers the rotational position to the robot 15 which, after a full revolution in each case, shifts the ultrasonic converter by the width of its head so that the entire forged shaft is exposed to the ultrasonic examination. In the drawing the ultrasonic converter is shown at a distance from the forged shaft as can be the case for contactless ultrasonic testing. However, a transfer medium (flowing water) can also be provided between the ultrasonic converter and the surface if, for example, a piezo-ultrasonic converter is to be used.

The signal of the ultrasonic converter 16 is processed by the conventional method by means of a device 17 to form an original which is then discretized into the original image. The latter is further processed in the computer 18 configured according to the invention in the manner described above.

This computer 18 encompasses the blocks 6 through 11 and 20 shown in detail in FIG. 1. The monitor of the computer 18 shows the control picture for regulation when the tolerable defect dimension is exceeded. Accordingly, a control command is transmitted to an adjusting member which, for example, in the case of forging defects, changes the setting of the forging press 19 in such away that the above-mentioned defect is excluded or reduced in size and frequency.

The present invention is limited only by the scope of the following claims, and not by any specifics of the embodiments disclosed above. Numerous modifications and variations of the above embodiments will be apparent to a skilled worker in the art in possession of the present disclosure, and as well other embodiments within the scope of the present invention.

We claim:

1. A method of displaying an image corresponding to an original picture, said image comprising a plurality of pixels corresponding to image points in said original picture and a gray level value for each said pixel indicating intensity at the location in said original picture corresponding to the pixel, said method comprising if each said gray level value of said original picture is not in digital form, but rather in analog form, digitizing each said analog gray level value according to a predetermined set of steps of gray level within a range of gray levels corresponding to brightness of said original picture, to have available in either case a corresponding digitized gray level signal value of a corresponding number of bits for each said pixel for further processing, each said digitized gray level signal value having more than eight bits in a binary representation, and displaying said image of said pixels with said digitized gray level signal values in a data representation system in a manner allowing an observer to distinguish between different ones of said gray level signal values of respective pixels and to perceive the direction of change in said gray level signal values in said image, wherein said data representation system comprises a monochrome display for said displaying, said monochrome display being capable of simultaneously displaying a predetermined number of levels of gray that is less than the number of said gray levels of said digitization of the gray level signal values of said pixels of said image, performing said displaying of said image over one display cycle, wherein:

at any one time said monochrome display distinguishably displays a limited number of said gray level signal values of said pixels of said image, namely those having their gray level signal values in a subrange within said range of said gray levels, said limited number of gray level signal values being simultaneously displayed corresponding to said predetermined number of gray levels that said monochrome monitor is capable of displaying;

at different times within said one display cycle different ones of said subranges of said gray level signal values of said pixels are distinguishably displayed; and within said display cycle all of said pixels with all of said gray level signal values are distinguishably displayed.

2. The method of claim 1, said capability of said monochrome monitor providing said predetermined number of gray levels to be $2^8 = 256$, said method comprising providing each said subrange to represent a corresponding 256 of said gray level signal values of said pixels for said distinguishable displaying thereof during each said corresponding portion of said display cycle.

3. The method of claim 2, further comprising dividing said predetermined number of gray level signal values having said range of gray levels by 256 to determine the quotient, and adding one to the quotient in the case of any remainder, whereby the number of different sets of said pixels which are to be distinguishably displayed within each said display cycle is determined.

4. The method of claim 3, further comprising adjusting the heights of the steps of said gray level signal values of said range so that each said gray level signal value occurs the same number of times in said image to be represented over said display cycle, whereby said method may be called the equidensity method.

5. The method of claim 2, wherein said number of gray levels of said digitized values of said pixels is $2^{12}$ or greater.

6. The method of claim 5, wherein said displaying of said image over said display cycle, with different parts of said image distinguishably displaying said gray level signal values of a respective set of said pixels at different times within said display cycle, effectively performs a gray scale accomodation approximately of that of the human eye.

7. The method of claim 1, further comprising using a computer processing system which includes said data representation system, said computer processing system taking said pixels of said image with said digitized gray level signal values as a first image, and forming therefrom a second image, said second image being processed from said first image and having the same set of pixels but with respective different gray levels at at least some of said pixels, and forming a difference image corresponding to the difference between said first and second images at each respective pixel, and for displaying said difference image on said data representation system with respective gray levels in said difference image.

8. A method of displaying an image corresponding to an original picture, said image comprising a plurality of pixels corresponding to image points in said original picture and a gray level value for each said pixel indicating intensity of said original picture at the corresponding location, said method comprising if each said gray level value of said original picture is not in digital form, but rather in analog form, digitizing each said analog gray level value according to a predetermined set of steps of gray level within a range of gray levels corresponding to brightness of said original picture, to have available in either case a corresponding digitized gray level signal value of a corresponding number of bits for each said pixel for further processing, each said digitized gray level signal value having more than eight bits in a binary representation, displaying said image of said pixels with said digitized gray level signal values in a data representation system that includes a color monitor, by assigning a respective color of said color monitor to each said gray level, and simultaneously displaying with the respective assigned ones of said colors all of said pixels of said image, wherein said assigning of said colors to said gray levels is performed in a manner which allows an observer to distinguish the gray level of each said pixel and to perceive the direction of transition of gray levels in said image.

9. The method of claim 8, further comprising each said color being given by its coordinates in a three dimensional color space, and each said coordinate of each said color being specified by 8 bits in a binary representation.

10. The method of claim 9, further comprising each said color being selected from all candidate colors in said coordinate space by appropriate criteria for elimination of respective sets of said candidate colors.

11. The method of claim 10, wherein said appropriate criteria for said elimination of respective ones of said candidate colors includes limiting said colors for said representation of said gray levels of said pixels to colors of approximately equal luminance L, according to the formula for luminance L in red, green and blue (RGB) color space, $$L = 0.30 \times R + 0.59 \times G + 0.11 \times B.$$

12. The method of claim 11, further comprising the step of limiting said candidate colors of said equal luminance to $2^{12}$ colors.

13. The method of claim 10, further comprising the step of limiting said candidate colors by selecting only colors from said color space with blue coordinate value B=0.

14. The method of claim 13, further comprising the step of limiting said candidate colors of said equal luminance to $2^{16}$ colors.

15. The method of claim 8, further comprising using a computer processing system which includes said data representation system, said computer processing system taking said pixels of said image with said digitized gray level signal values as a first image, and forming therefrom a second image, said second image being processed from said first image and having the same set of pixels but with respective different gray levels at at least some of said pixels, and forming a difference image corresponding to the difference between said first and second images at each respective pixel, and for displaying said difference image on said data representation system with respective gray levels in said difference image.

16. A device for performing a method for displaying an image corresponding to an original picture, said image comprising a plurality of pixels corresponding to image points in said original picture and a gray level value for each said pixel indicating intensity at the location in said original picture corresponding to the pixel, said method comprising
if each said gray level value of said original picture is not in digital form, but rather in analog form, digitizing each said analog gray level value according to a predetermined set of steps of gray level within a range of gray levels corresponding to brightness of said original picture, to have available in either case a corresponding digitized gray level signal value of a corresponding number of bits for each said pixel for further processing, each said digitized gray level signal value having more than eight bits in a binary representation, and
displaying said image of said pixels with said digitized gray level signal values in a data representation system in a manner allowing an observer to distinguish between different ones of said gray level signal values of respective pixels and to perceive the direction of change in said gray level signal values in said image, wherein said data representation system comprising a monochrome display for said displaying, said monochrome display being capable of simultaneously displaying a predetermined number of levels of gray that is less than the number of said gray levels of said digitization of the gray level signal values of said pixels of said image, performing said displaying of said image over one display cycle,
wherein (1) at any one time said monochrome display distinguishably displays a limited number of said gray level signal values of said pixels of said image, namely those having their gray level signal values in a subrange within said range of said gray levels, said limited number of gray level signal values being simultaneously displayed corresponding to said predetermined number of gray levels that said monochrome monitor is capable of displaying, (2) at different times within said one display cycle different ones of said subranges of said gray level signal values of said pixels are distinguishably displayed; and (3) within said display cycle all of said pixels with all of said gray level signal values are distinguishably displayed,
said device comprising a computer processing system which includes said data representation system with said monochrome display and means for said performing of said displaying of said image over one image cycle on said monochrome display.

17. A device according to claim 16, said computer processing system with said data representation system and said means for providing said displaying of said image including means for taking said pixels of said image with said digitized gray level signal values as a first image, and forming therefrom a second image, said second image being processed from said first image and having the same set of pixels but with respective different gray levels at at least some of said pixels, and forming a difference image corresponding to the difference between said first and second images at each respective pixel, and for displaying said difference image on said data representation system with respective gray levels in said difference image.

18. A device for performing a method for displaying an image corresponding to an original picture, said image comprising a plurality of pixels corresponding to image points in said original picture and a gray level value for each said pixel indicating intensity of said original picture at the corresponding location, said method comprising
if each said gray level value of said original picture is not in digital form, but rather in analog form, digitizing each said analog gray level value according to a predetermined set of steps of gray level within a range of gray levels corresponding to brightness of said original picture, to have available in either case a corresponding digitized gray level signal value of a corresponding number of bits for each said pixel for further processing, each said digitized gray level signal value having more than eight bits in a binary representation,
displaying said image of said pixels with said digitized gray level signal values in a data representation system that includes a color monitor, by assigning a respective color of said color monitor to each said gray level, and simultaneously displaying with the respective assigned ones of said colors all of said pixels of said image, and
performing said assigning of said colors to said gray levels in a manner which allows an observer to distinguish the gray level of each said pixel and to perceive the direction of transition of gray levels in said image, wherein said device comprises a computer processing system which includes said data representation system with said color monitor and means for providing said simultaneous displaying of all of said pixels of said image on said color monitor and said performing of said assigning of said colors to said pixels.

19. A device according to claim 18, said computer processing system with said data representation system and said means for providing said displaying of said image and said assigning of said colors including means for taking said pixels of said image with said digitized gray levels as a first image, and forming therefrom a second image, said second image being processed from said first image and having the same set of pixels but with respective different gray levels at at least some of said pixels, and forming a difference image corresponding to the difference between said first and second images at each respective pixel, and for displaying said difference image on said data representation system with respective gray levels in said difference image.

* * * * *